(12) United States Patent
Koyama et al.

(10) Patent No.: US 8,607,716 B2
(45) Date of Patent: Dec. 17, 2013

(54) BURNER FOR HIGHLY CAKING COAL, AND GASIFIER

(75) Inventors: Yoshinori Koyama, Nagasaki (JP); Takeshi Aruga, Nagasaki (JP); Hiromi Ishii, Tokyo (JP); Kazuyuki Myoyo, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 998 days.

(21) Appl. No.: 12/452,134

(22) PCT Filed: Jun. 18, 2008

(86) PCT No.: PCT/JP2008/061117
§ 371 (c)(1),
(2), (4) Date: Dec. 17, 2009

(87) PCT Pub. No.: WO2009/069330
PCT Pub. Date: Jun. 4, 2009

(65) Prior Publication Data
US 2010/0126067 A1     May 27, 2010

(30) Foreign Application Priority Data

Nov. 27, 2007   (JP) ................................ 2007-305655

(51) Int. Cl.
*F23D 1/00*          (2006.01)
*F23L 7/00*          (2006.01)

(52) U.S. Cl.
USPC ......... 110/188; 110/104 B; 110/261; 110/306

(58) Field of Classification Search
USPC ...................... 110/104 B, 188, 190, 263, 306
See application file for complete search history.

(56) References Cited

U.S. PATENT DOCUMENTS

| 4,428,309 A | * | 1/1984 | Chang ........................... 110/262 |
| 4,924,784 A | * | 5/1990 | Lennon et al. ................ 110/261 |

(Continued)

FOREIGN PATENT DOCUMENTS

| JP | H02-206687 | 8/1990 |
| JP | H03-025202 | 2/1991 |

(Continued)

OTHER PUBLICATIONS

Japan Patent Office, Decision to Grant a Patent for Japanese Patent Application No. 2007-305655, Jul. 3, 2012.

(Continued)

*Primary Examiner* — Kenneth Rinehart
*Assistant Examiner* — David J Laux
(74) *Attorney, Agent, or Firm* — Manabu Kanesaka; Kenneth M. Berner; Benjamin J. Hauptman

(57) ABSTRACT

In a burner for highly caking coal in which a solid fuel channel and a gasifying agent channel are provided in a double pipe structure, the temperature increase of the particles of a highly caking solid fuel and the resulting fusion and expansion of the particles are prevented or suppressed, thereby enabling a stable operation of the gasifier. In a burner for highly caking coal in which a solid fuel channel that is attached for gasifying a highly caking solid fuel that has been pulverized into particles and that supplies the solid fuel into the gasifier, and a gasifying agent channel that supplies a gasifying agent into the gasifier are provided in a double pipe structure, the burner has a triple pipe structure including a cooling water channel that circulates cooling water between the solid fuel channel and the gasifying agent channel, and the cooling water is recovered after use.

6 Claims, 9 Drawing Sheets

(56) References Cited

U.S. PATENT DOCUMENTS

| | | | |
|---|---|---|---|
| 7,762,200 B2 * | 7/2010 | Fischer et al. | 110/347 |
| 2010/0126067 A1 | 5/2010 | Koyama et al. | |

FOREIGN PATENT DOCUMENTS

| | | |
|---|---|---|
| JP | H07-071720 | 3/1995 |
| JP | 2002-161284 | 6/2002 |
| JP | 2003-279006 | 2/2003 |
| JP | 2005-060834 | 3/2005 |
| KR | 20100018582 A | 2/2010 |

OTHER PUBLICATIONS

IP Australia, Notice of Acceptance for Australian Patent Application No. 2008330927, Jul. 19, 2012.

Korean Patent Office, "Decision to Grant a Patent for KR 10-2009-7026846", Nov. 5, 2012.

Korean Patent Office, "Decision for Grant of Patent for KR 2012-7019089", May 20, 2013.

* cited by examiner

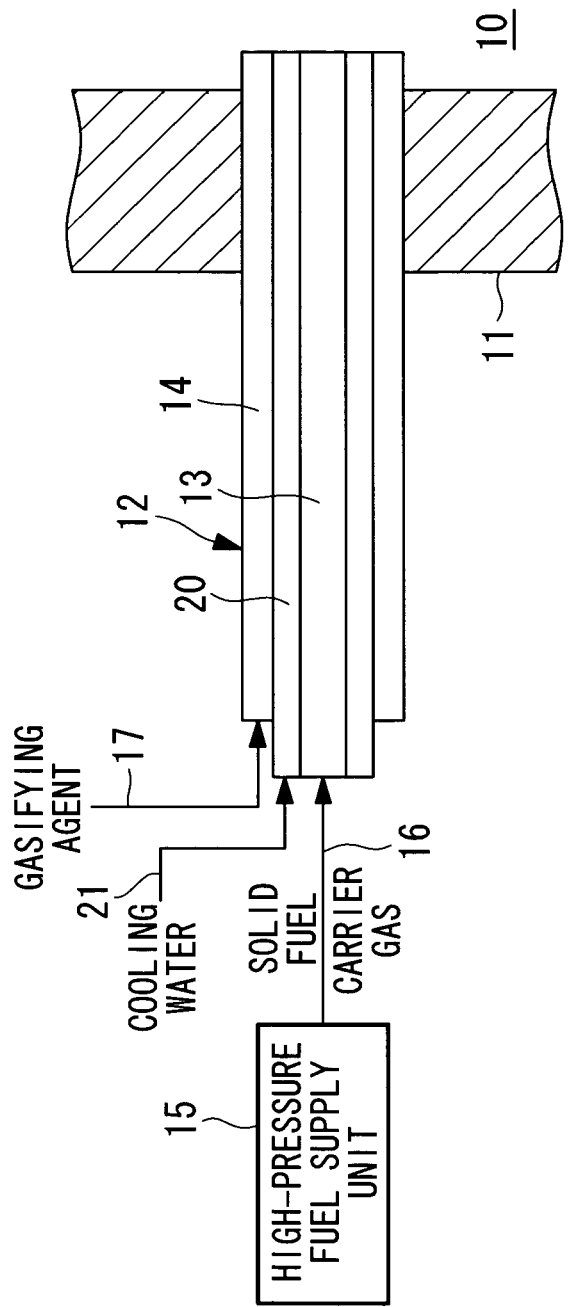

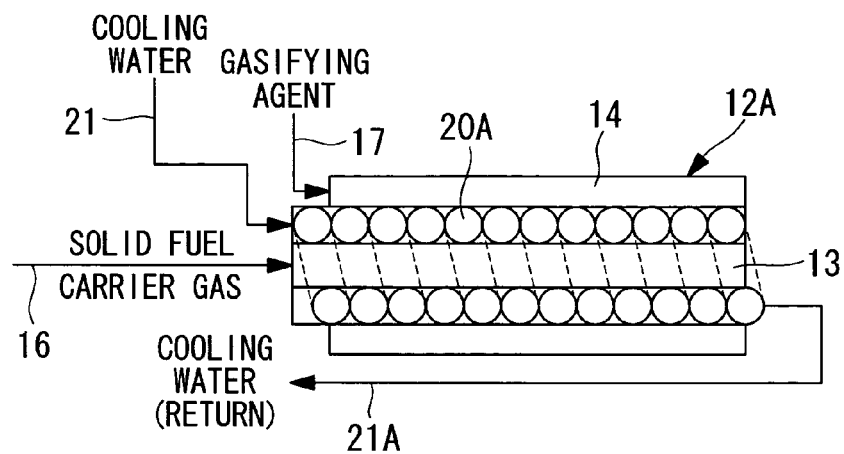
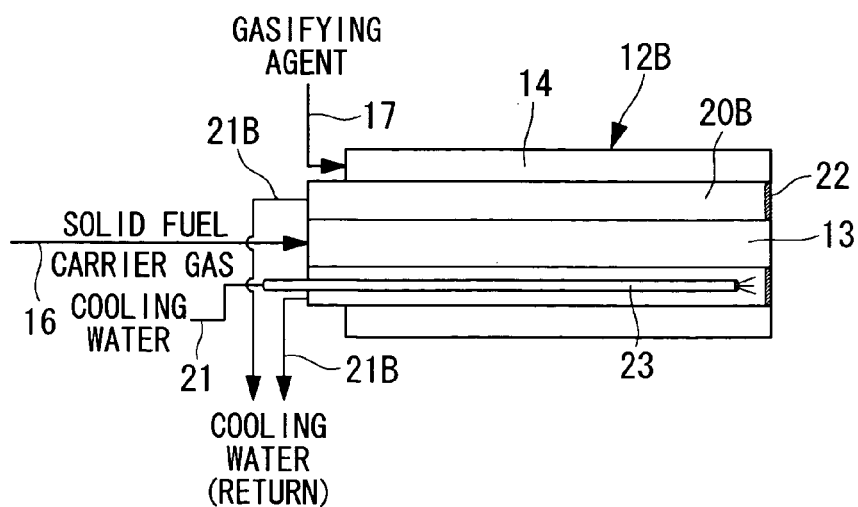

BURNER FOR HIGHLY CAKING COAL, AND GASIFIER

TECHNICAL FIELD

The present invention relates to a burner for highly caking coal that is applied to a solid fuel gasifier or the like of an integrated coal gasification combined cycle facility, and to a gasifier.

BACKGROUND ART

Conventionally, so-called integrated coal gasification combined cycle power plants (IGCC) have been developed and put into practical use with the goal of improving the power generation efficiency of coal-fired power plants. Such an integrated coal gasification combined cycle power plant (hereinafter, referred to as an "IGCC") includes a gas turbine generator that uses coal gas obtained by gasifying coal as a fuel, to operate and generate power, and a steam turbine generator that uses the steam obtained by recovering heat from high-temperature combustion exhaust gas discharged from the gas turbine using an exhaust heat recovery boiler, to operate and generate power.

In such an IGCC, the fuel supply to the gasifier that generates the coal gas is performed by transporting a solid fuel that has been pulverized into particles to a burner by using gas flow of nitrogen, carbon dioxide, air, or the like as a carrier gas, and jetting the solid fuel from the burner into the gasifier. On the other hand, a high-pressure operation in which the internal pressure in the gasifier is set high is performed, in view of the configuration of the system and the reactions inside the gasifier.

In order to perform such a high-pressure operation, the gasifier that is operated at a high pressure is formed as a pressure vessel, and a burner that penetrates through the wall surface of this pressure vessel houses a solid fuel (pulverized coal, petroleum coke, or the like) and a gasifying agent (air, oxygen, water steam, or the like) in the same pipe.

FIG. 10 shows a conventional structure in which the burner section of a gasifier is enlarged. In the structure, a burner for highly caking coal (hereinafter referred to as a "burner") 12' is attached penetrating through a surrounding wall (furnace wall) 11 of a gasifier 10 that is formed as a pressure vessel. The burner 12' has a double pipe structure in which a solid fuel channel 13 on the inner side and a gasifying agent channel 14 on the outer side are arranged concentrically.

The solid fuel channel 13 is connected via a fuel supply line 16 with a high-pressure fuel supply unit 15 that supplies a solid fuel that has been pulverized into particles. Also, a carrier gas whose flow rate is controlled by a flow rate control unit (not shown) is supplied to the high-pressure fuel supply unit 15. Accordingly, the solid fuel channel 13 supplies the solid fuel, which is adjusted to the desired supply rate by the high-pressure fuel supply unit 15, into the gasifier 10, using the carrier gas, which is adjusted to the desired flow rate by the flow rate control unit. That is, the particulate solid fuel is transported by the carrier gas flow, and supplied into the gasifier 10.

The gasifying agent channel 14 is connected with a gasifying agent supply line 17 that supplies a gasifying agent, and supplies the gasifying agent, which is adjusted to the desired supply rate by a flow rate control unit (not shown), into the gasifier 10.

Thus, by supplying the solid fuel, the carrier gas and the gasifying agent into the gasifier 10, the solid fuel that has undergone a predetermined treatment in the gasifier 10 is gasified, and supplied to a gas cleanup facility in a subsequent step.

As another conventional technology, in a pulverized raw material gasification apparatus of the entrained flow-type that uses a pulverized carbon raw material such as coal as a gasification raw material, in addition to using a carrier gas, such as nitrogen gas, for the gasification raw material and an oxidizing agent such as oxygen or air, and gasifies the raw material at a temperature of at least the melting point of the ashes of the pulverized carbon raw material, it is known to provide a gas spouting nozzle upstream of an area near an exit portion where the carrier line of the gasification raw material is supplied into the gasification apparatus, in order to spout a gas such as nitrogen gas, carbon dioxide gas, or an inert gas toward the exit portion of the carrier line, and cause that gas to mix with the gasification raw material. This gas spouting nozzle blows away slag or the like adhering to the exit portion of the carrier line of the gasification raw material, and is considered to be capable of constantly maintaining a state where no matter is adhering to the burner exit portion (for example, see Patent Citation 1).

In addition, a technology has been disclosed by which an auxiliary mixing nozzle that blows, as gas flow, compressed air supplied from a part of a secondary fuel air or from the outside of a wind box is provided in a pulverized solid fuel combustion apparatus that burns a mixture of a solid fuel such as pulverized coal and a gas such as air as a fuel, thereby preventing the erosion of a fuel-air mixture nozzle and the adhesion and deposition of the fuel (for example, see Patent Citation 2).

Patent Citation 1: Japanese Examined Patent Application, Publication No. Hei 08-003361 (see FIG. 1)

Patent Citation 2: The Publication of Japanese Patent No. 3790489

DISCLOSURE OF INVENTION

According to the above-described conventional technology shown in FIG. 10, the high-pressure operation of the gasifier 10 for gasifying the solid fuel leads to a state where the interparticle distance of the solid fuel transported by gas flow is small. That is, the solid fuel transported by gas flow through the solid fuel channel 13 has a very high spatial filling fraction.

On the other hand, in the burner 12' including the solid fuel channel 13 and the gasifying agent channel 14 arranged in a concentric double pipe structure, the heat transfer coefficient between the two channels 13 and 14 becomes high, so that the amount of heat with which the gasifying agent at the high temperature side heats the solid fuel at the low temperature side is increased.

For this reason, the particle temperature of the solid fuel that is subject to heating by the gasifying agent is increased, and the particles of the solid fuel having an elevated temperature fuse and expand. At this time, when the solid fuel is highly caking, there may be the problem that the fused and expanded adjacent particles of the solid fuel agglomerate, thereby causing incomplete combustion, or the problem that the fused and expanded solid fuel adheres to the internal surface of the solid fuel channel 13, thereby causing blockage of the burner 12'. Such problems occur not only with burners that use solid fuels such as pulverized coal and petroleum coke, but also with burners of the gasifiers that use other highly caking solid fuels, including, for example, oil residue and plastics.

Thus, in a burner for highly caking coal used for a gasifier for gasifying a highly caking solid fuel, there is a need to solve the problems that could be caused by the temperature increase of the solid fuel particles and the resulting fusion and expansion thereof, due to heat transfer in the burner, which includes a solid fuel channel and a gasifying agent channel in a concentric double pipe structure.

The present invention was achieved in view of the foregoing circumstances, and it is an object of the invention to provide a burner for highly caking coal in which a solid fuel channel and a gasifying agent channel are provided in a double pipe structure, wherein the temperature increase of the particles of a highly caking solid fuel due to heat transfer in the burner and the resulting fusion and expansion of the particles are prevented or suppressed, thereby enabling a stable operation of the gasifier.

The following solutions were used for the present invention in order to solve the above-described problems.

A burner for highly caking coal according to a first aspect of the present invention is a burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a double pipe structure, wherein the burner has a triple pipe structure including a cooling water channel that circulates cooling water between the solid fuel channel and the gasifying agent channel, and the cooling water is recovered after use.

According to such a burner for highly caking coal according to the first aspect of the present invention, the burner has a triple pipe structure including a cooling water channel that circulates cooling water between the solid fuel channel and the gasifying agent channel, and the cooling water is recovered after use. Accordingly, the temperature difference between the solid fuel channel and the gasifying agent channel is decreased by the cooling water channel provided therebetween. Consequently, the heating amount that the particles of the solid fuel receive from a high-temperature gasifying agent decreases, so that it is possible to prevent or suppress the fusion and the expansion due to an increase in temperature of the particles of a highly caking solid fuel. Moreover, by recovering the used cooling waters having an elevated temperature and utilizing the cooling water by converting it into, for example, power generating water steam, it is possible to eliminate energy loss.

A burner for highly caking coal according to a second aspect of the present invention is a burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a double pipe structure, wherein the burner has a triple pipe structure including a cooling water channel that passes cooling water between the solid fuel channel and the gasifying agent channel, and the cooling water is poured into the gasifier as a gasifying agent.

According to such a burner for highly caking coal according to the second aspect of the present invention, the burner has a triple pipe structure including a cooling water channel that passes cooling water between the solid fuel channel and the gasifying agent channel, and the cooling water is poured into the gasifier as a gasifying agent. Accordingly, the temperature difference between the solid fuel channel and the gasifying agent channel is decreased by the cooling water channel provided therebetween. Consequently, the heating amount that the particles of the solid fuel receive from a high-temperature gasifying agent decreases, so that it is possible to prevent or suppress the fusion and the expansion due to an increase in temperature of the particles of a highly caking solid fuel. Moreover, the used cooling water having an elevated temperature is poured into the gasifier as a gasifying agent, and thus converted into a gasifying gas through a gasification reaction.

In the above-described invention, it is preferable that a cooling water temperature control portion that detects a blockage situation of the solid fuel channel, and adjusts a temperature of the cooling water is provided. This makes it possible to minimize the temperature decrease of the solid fuel that is transported by gas flow and that of the gasifying agent.

In this case, it is preferable that the cooling water temperature control portion detects a differential pressure between a burner inlet of the solid fuel channel and a suitable place located downstream from the burner inlet, and decreases the temperature of the cooling water when a flow loss coefficient converted from the differential pressure increases to at least a predetermined value. This makes it possible to reliably judge a channel blockage situation of the solid fuel channel based on a flow loss coefficient obtained by converting the differential pressure that changes according to the pressure of the gasifier, the flow rate of the solid fuel and the flow rate of the carrier gas.

Furthermore, it is preferable that the cooling water temperature control portion decreases the temperature of the cooling water when a flow loss coefficient converted from a differential pressure ratio of a first differential pressure detected between a burner inlet and a suitable place located downstream from the burner inlet and a second differential pressure measured in an arbitrary section set in a fuel supply line connected to an upstream side of the solid fuel channel increases to at least a predetermined value. This makes it possible to reliably judge a channel blockage situation of the solid fuel channel based on a flow loss coefficient obtained by the pressure of the gasification channel and the differential pressure that is not affected by the influence of the flow rate of the solid fuel and the flow rate of the carrier gas.

Furthermore, it is preferable that the cooling water temperature control portion detects an internal surface temperature of the solid fuel channel, and decreases the temperature of the cooling water when the detected internal surface temperature is a high temperature of at least a predetermined value. This makes it possible to reliably judge a channel blockage situation of the solid fuel channel based on an actual internal surface temperature.

Furthermore, in the above-described invention, it is preferable that the cooling water temperature control portion detects an internal surface temperature of the solid fuel channel, and adjusts the temperature of the cooling water so that the internal surface temperature will be smaller than a preset temperature determined according to a caking property of the solid fuel. This enables an efficient operation at a maximum temperature at which the problem of channel blockage does not occur.

A gasifier according the present invention is a gasifier in the form of a pressure vessel into which a solid fuel such as particulate highly caking coal is supplied by gas flow transportation, and that subjects the solid fuel to a gasification treatment under a high-pressure environment together with a gasifying agent, wherein the gasifier includes the burner for highly caking coal according to any of claims 1 to 7.

Such a gas furnace includes the above-described burner for highly caking coal, and therefore can decrease the solid fuel temperature that may cause a channel blockage, in accordance with the state of progress of the channel blockage of the solid fuel channel in the burner for highly caking coal, thereby preventing or suppressing the fusion and the expansion due to a temperature increase of the particles of the highly caking solid fuel.

According to the present invention described above, the burner for highly caking coal that is used for the gasifier for gasifying a highly caking solid fuel has a triple pipe structure including a cooling water channel that circulates or passes cooling water between the solid fuel channel and the gasifying agent channel. Accordingly, the temperature difference between the solid fuel channel and the gasifying agent channel is decreased by the cooling water channel provided therebetween. Consequently, the heating amount that the particles of the solid fuel receive from a high-temperature gasifying agent decreases, so that it is possible to prevent or suppress the fusion and the expansion due to an increase in temperature of the particles of a highly caking solid fuel.

Accordingly, it is possible to prevent the problem that the fused and expanded adjacent particles agglomerate due to the temperature increase of the highly caking solid fuel, thereby causing incomplete combustion, or the problem that those particles adhere to the internal surface of the solid fuel channel, thereby causing a blockage. Consequently, it is possible to operate the burner for highly caking coal and the gasifier in a stable manner. Furthermore, it is also possible to expand the range of applications for highly caking solid fuels that can be used for the burner for highly caking coal and the gasifier.

Moreover, by recovering used cooling water having an elevated temperature and using the cooling water by converting it, for example, into power generating water steam, it is possible to eliminate energy loss, and by pouring the cooling water into a gasifier as a gasifying agent, the cooling water is converted into a gasifying gas through a gasification reaction. Accordingly, the cooling water supplied to the cooling water channel formed between the solid fuel channel and the gasifying agent channel not only can be used for cooling a solid fuel, but also can be effectively utilized for the operation of a gasifier.

BRIEF DESCRIPTION OF DRAWINGS

FIG. 1 is a configuration diagram of a relevant part illustrating a first embodiment of a burner for highly caking coal and a gasifier according to the present invention.

FIG. 2 is a configuration diagram of a relevant part illustrating a burner for highly caking coal and a gasifier that use a helical-pipe system.

FIG. 3 is a configuration diagram of a relevant part illustrating a burner for highly caking coal and a gasifier that use an annular system.

EXPLANATION OF REFERENCE

Figure 4:
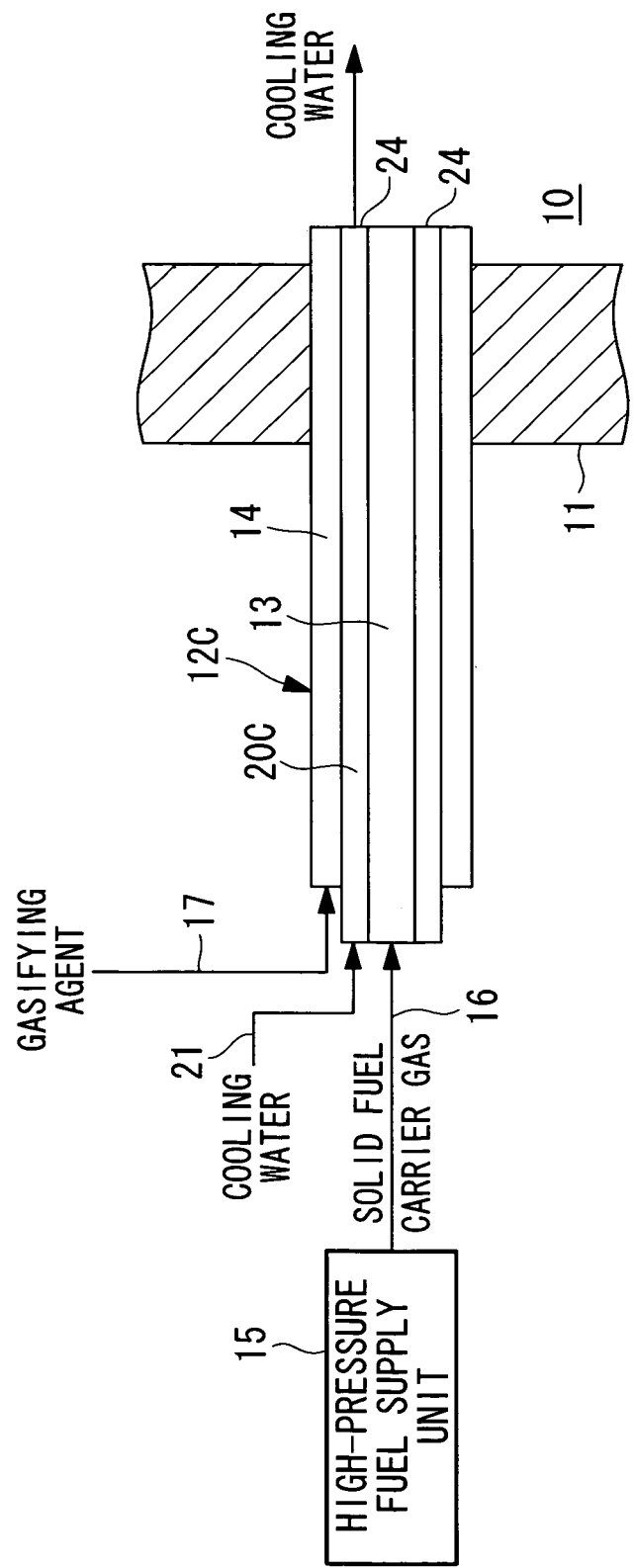
FIG. 4 is a configuration diagram of a relevant part illustrating a second embodiment of a burner for highly caking coal and a gasifier according to the present invention.

10: Gasifier
11: Surrounding wall (Furnace wall)
12, 12A, 12B, 12C: Burner for highly caking coal (Burner)
13: Solid fuel channel
14: Gasifying agent channel
20: Cooling water channel
20A: Helical cooling water channel
20B: Annular cooling water channel
20C: Cooling water passage channel
30, 30A, 30B, 30C: Cooling water temperature control unit
40 40A: Blockage detection unit
50: Temperature sensor

BEST MODE FOR CARRYING OUT THE INVENTION

Hereinafter, one embodiment of a burner for highly caking coal and a gasifier according to the present invention will be described based on the drawings.

Figure 9:
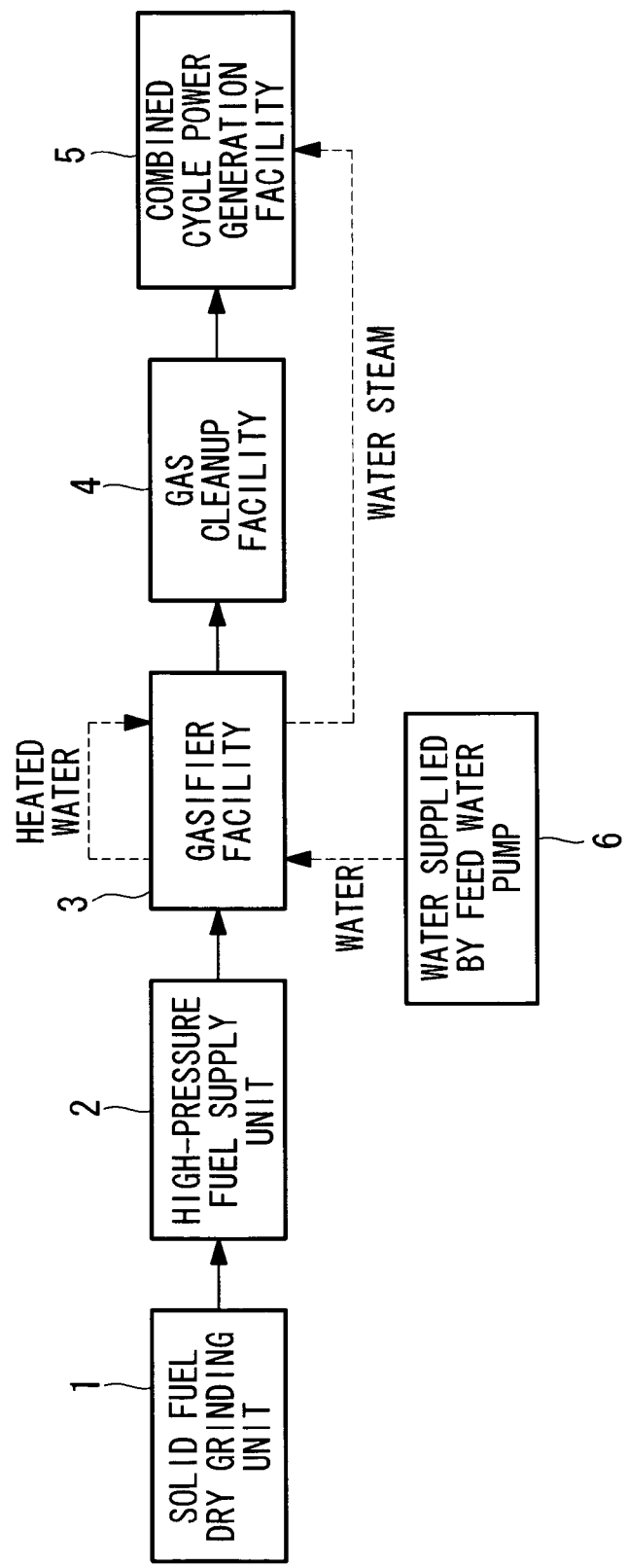
FIG. 9 is a block diagram showing the outline of an integrated coal gasification combined cycle plant (IGCC).
Figure 10:
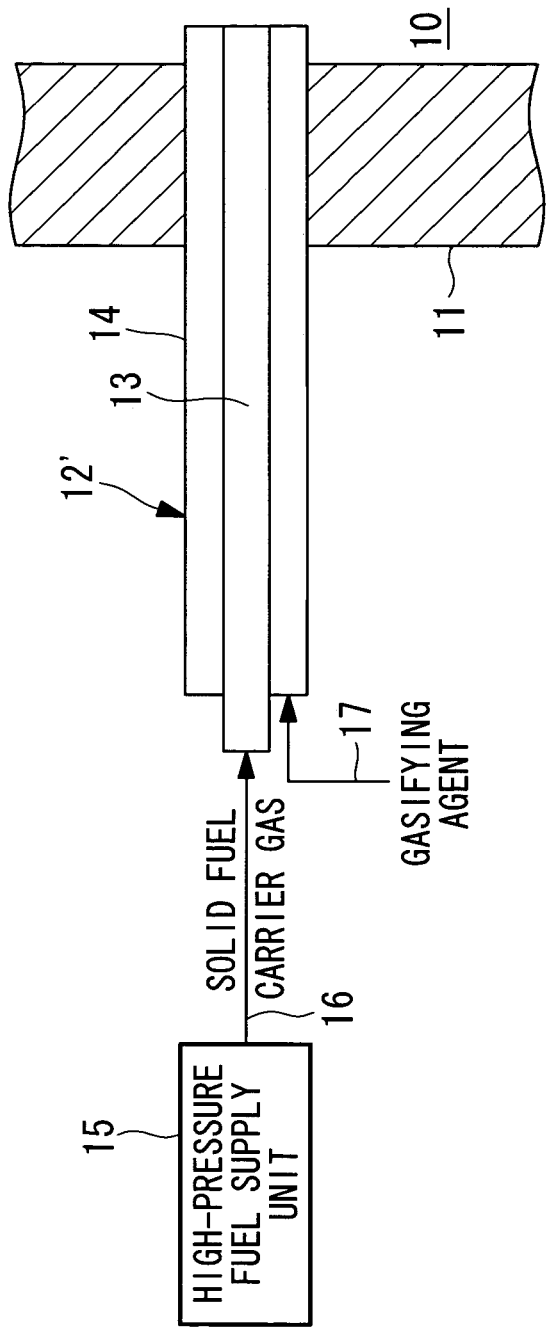
FIG. 10 is a configuration diagram of a relevant part illustrating an example of a conventional burner for highly caking coal and gasifier.

FIG. 9 is a block diagram showing the outline of an integrated coal gasification combined cycle power plant (IGCC). This IGCC is a combined cycle power generation facility that generates power using coal gas obtained by gasifying coal (a solid fuel) as a fuel. That is, the IGCC includes, as its main components, a solid fuel dry grinding unit 1 that dries and grinds a solid fuel such as coal into a particulate solid fuel, a high-pressure fuel supply unit 2 that supplies the particulate solid fuel by gas flow using a carrier gas, a gasifier facility 3 that receives the supply of the solid fuel transported by gas flow into the gasifier and the gasifying agent, and gasifies the solid fuel to obtain a gasified coal gas, a gas cleanup facility 4 that removes impurities and the like contained in the coal gas produced at the gasifier facility 3, thereby purifying the coal gas, and a combined cycle power generation facility 5 constituted by a gas turbine generator and a steam turbine generator.

The gas turbine generator is a generator that operates a gas turbine by using purified coal gas as a fuel, and generates power by being driven by the shaft output of the gas turbine.

The steam turbine generator is a generator that generates power by being driven by the shaft output of the steam turbine operated using steam energy produced by recovering heat from the combustion exhaust gas by introducing a high-temperature combustion exhaust gas into an exhaust heat recovery boiler discharged from the gas turbine of the gas turbine generator.

Also, the gasifier facility 3 is provided with a feed water pump 6 that supplies water. The water supplied from the feed water pump 6 is heated in the gasifier facility 3, and water steam produced in the gasifier facility 3 is supplied to the combined cycle power generation facility 5.

First Embodiment

As shown in FIG. 1, the gasifier facility 3 of the IGCC described above is provided with a gasifier 10 in the form of a pressure vessel. A burner 12 for highly caking coal (hereinafter referred to as a "burner") is attached to the gasifier 10 such that it penetrates through a surrounding wall 11, which is a furnace wall constituting the pressure vessel. The burner 12 has a concentric triple pipe structure in which a cooling water channel 20 is provided between the solid fuel channel 13 disposed at the central position on the inner side and the gasifying agent channel 14 disposed on the outer side. In addition, the cooling water channel 20 in this embodiment has a circulation channel structure in which used cooling water that has been circulated is recovered through a cooling water return line (not shown).

The solid fuel channel 13 is a fuel supply channel that supplies a highly caking solid fuel that has been pulverized into particles into the gasifier 10. The solid fuel channel 13 is connected with a high-pressure fuel supply unit 15 via a fuel supply line 16.

The high-pressure fuel supply unit 15 is an apparatus for receiving supply of the solid fuel pulverized into particles, and supplying the desired amount of the solid fuel to the gasifier 10 by gas flow transportation using a carrier gas. A carrier gas whose flow rate is controlled is supplied to the high-pressure fuel supply unit 15. Carrier gases that can be used for the gas flow transportation in this case include nitrogen, carbon dioxide, air, and the like.

The gasifying agent channel 14 is connected with a gasifying agent source (not shown) via a gasifying agent supply line 17. The gasifying agent channel 14 supplies a high-temperature gasifying agent that is adjusted at the desired flow rate into the gasifier 10. Gasifying agents that can be used in this case include air, oxygen, steam, and the like.

The cooling water channel 20 is connected with a cooling water source (not shown) via a cooling water supply line 21.

In this embodiment, the cooling water channel 20 has a circulation channel structure in which cooling water is recovered after circulating through the inside of the burner 12. Also, the cooling water supply line 21 has a pipe channel configuration in which the introduced cooling water is supplied to the cooling water channel 20 and circulated therethrough, and thereafter the recovered cooling water is supplied to a suitable place for reuse. Water supplied by the feed water pump 6 of the gasifier facility 3, heated water (see FIG. 9) of the gasifier facility 3, or a water mixture of the water supplied by the feed water pump 6 and the heated water of the gasifier facility 3 is used for the cooling water introduced into the cooling water channel 20.

The cooling water supplied to the cooling water channel 20 flows between the solid fuel channel 13 and the gasifying agent channel 14 while circulating, it receives heat from the gasifying agent at the high temperature side and is thus elevated in temperature. However, the cooling water channel 20 is in contact with the periphery of the solid fuel channel 13 on the innermost side, and the cooling water flowing through the cooling water channel 20 has a lower temperature than the gasifying agent. Accordingly, compared with a conventional double pipe structure in which the solid fuel channel 13 and the gasifying agent channel 14 are in direct contact, the difference in temperature between the solid fuel channel 13 and the cooling water pipe 20 disposed at the periphery thereof is decreased, and the amount of heat exchanged between the gasifying agent at the high temperature side and the solid fuel at the low temperature side is also reduced. For this reason, the temperature increase of the particles of the solid fuel that are transported by the gas flow in the solid fuel channel 13 is suppressed through a reduction of the heating amount.

Thus, since the temperature increase of the particles is suppressed, the temperature of the solid fuel flowing through the solid fuel channel 13 will not increase to a temperature at which the particles fuse and expand. Accordingly, adjacent particles will be prevented from agglomerating, and also will not promote blockage of the solid fuel channel 13 by adhering to its internal wall.

Also, the cooling water that has circulated and flown through the cooling water channel 20 is recovered, and supplied to a suitable place for reuse: for example, it is reused as water that is supplied by the feed water pump 6, or caused to merge with the heated water of the gasifier facility 3, or converted into water steam by heat exchange performed by the gasifier facility 3, in order to be supplied to the combined cycle power generation facility 5. That is, the burner 12 described in this embodiment has a triple pipe structure including the cooling water channel 20 that circulates cooling water between the solid fuel channel 13 and the gasifying agent channel 14, and it recovers and effectively reuses the used cooling water that has been circulated through the cooling water channel 20.

Examples of the above-described circulation system of the cooling water channel 20 include a helical-pipe system as shown in FIG. 2 and an annular system as shown in FIG. 3.

A burner 12A that uses the helical-pipe system shown in FIG. 2 is provided with a helical cooling water channel 20A formed by helically winding a pipe serving as a cooling water channel around the solid fuel channel 13. Accordingly, the cooling water supplied to the helical cooling water channel 20A from the cooling water supply line 21 will flow in from one side of the helical part, and flow out of the other side thereof. With the illustrated helical cooling water channel 20A, the cooling water supply line 21 is connected to the inlet side of the burner 12A and a cooling water return line 21A is connected to a portion near the tip of the burner outlet side, which is located inside of the gasifier 10. For this reason, the cooling water that has flown in the helical cooling water channel 20A from the inlet side of the burner 12A flows through the helical cooling water channel 20A to a portion near the tip of the burner outlet side, which is located inside of the gasifier 10, and thereafter passes through the cooling water return line 21A and is guided to a place where it is reused.

With a burner 12B that uses the annular system shown in FIG. 3, cooling water is supplied to an annular cooling water channel 20B that is closed by providing a sealing plate 22 at the tip of the burner outlet side, and circulated therethrough. In the illustrated example, cooling water is supplied by inserting, into the annular cooling water channel 20B closed at its one end by the sealing plate 22 and having a toroidal cross sectional shape, a feed water pipe 23 connected with the cooling water supply line 21, from the burner inlet side to a portion near the sealing plate 22.

A cooling water return line 21B that recovers cooling water that has circulated through the inside of the annular cooling water channel 20B is connected to an end at the burner inlet side of the annular cooling water channel 20B. Accordingly, cooling water with a low temperature is supplied to the burner outlet side in the annular cooling water channel 20B, and cooling water that has circulated through the inside of the annular cooling water channel 20B flows out from the cooling water return line 21B connected to the burner inlet side, and is recovered. The cooling water recovered in this manner is guided to a place where it is reused.

Second Embodiment

A second embodiment for the above-described burner that can be provided penetrating through the gasifier 10 will be described based on FIG. 4. It should be noted that the same portions as in the above-described embodiment are denoted by the same reference numerals, and a detailed description thereof has been omitted.

In this embodiment, a burner 12C has a concentric triple pipe structure in which a cooling water passage channel 20C that passes cooling water between the solid fuel channel 13 and the gasifying agent channel 14 is provided, and used cooling water is charged into the gasifier 10 as a gasifying agent from the burner outlet side of the cooling water passage channel 20C. That is, the burner 12C of this embodiment is similar to the above-described embodiment in that it has a triple pipe structure, but differs in that a cooling agent is directly charged into the gasifier 10 as a gasifying agent, instead of circulating and recovering the cooling water.

Therefore, with the burner 12C in this embodiment, the cooling water supply line 21 is connected to the burner inlet side and receives a supply of cooling water, but there is no connection with a cooling water return pipe that recovers used cooling water, and used cooling water flows out from a cooling water outlet 24 that is open to the burner outlet side into the gasifier 10, and serves as a gasifying agent.

Also in this configuration, the cooling water that has been supplied to the cooling water passage channel 20C passes through between the solid fuel channel 13 and the gasifying agent channel 14, so that the cooling water undergoes a temperature increase as a result of receiving heating by the gasifying agent on the high temperature side.

However, the cooling water passage channel 20C is in contact with the periphery of the solid fuel channel 13 on the innermost side, and the cooling water flowing through the cooling water passage channel 20C has a lower temperature than the gasifying agent. Accordingly, compared with a conventional double pipe structure in which the solid fuel channel 13 and the gasifying agent channel 14 are in direct contact, the difference in temperature between the solid fuel channel 13 and the cooling water passage line channel 20C disposed at the periphery thereof is decreased, and the amount of heat exchanged between the gasifying agent at the high temperature side and the solid fuel at the low temperature side is also reduced. For this reason, the temperature increase of the particles of the solid fuel transported by the gas flow in the solid fuel channel 13 is suppressed through a reduction of the heating amount.

Thus, since the temperature increase of the particles is suppressed, the temperature of the solid fuel flowing through the solid fuel channel 13 will not increase to a temperature at which the particles fuse and expand. Accordingly, adjacent particles will be prevented from agglomerating, and also will not promote blockage of the solid fuel channel 13 by adhering to its internal wall.

Also, the cooling water used for cooling the solid fuel is eventually used effectively as a gasifying agent. Accordingly, the above-described cooling water is converted into a gasifying gas such as hydrogen gas through a gasification reaction, thus enabling effective use of the cooling water.

Third Embodiment

A third embodiment for the above-described burner that can be provided penetrating through the gasifier 10 will be described based on FIG. 5. It should be noted that the same portions as in the above-described embodiments are denoted by the same reference numerals, and a detailed description thereof has been omitted.

In this embodiment, a cooling water temperature control portion that detects a blockage situation of the solid fuel channel 13, and adjusts the temperature of cooling water is provided. That is, to prevent agglomeration of solid fuel particles and blockage of the burner 12, the temperature of cooling water supplied to the cooling water channel 20 is controlled by directly detecting a blockage situation of the solid fuel channel 13, and the temperature decrease of the solid fuel that is transported by the gas flow in the solid fuel channel 13 and that of the gasifying agent flowing through the gasifying agent channel 14 are suppressed to the minimum, thereby enabling an efficient operation.

In the following, the above-described cooling water temperature control portion will be specifically described with reference to FIG. 5.

Figure 5:
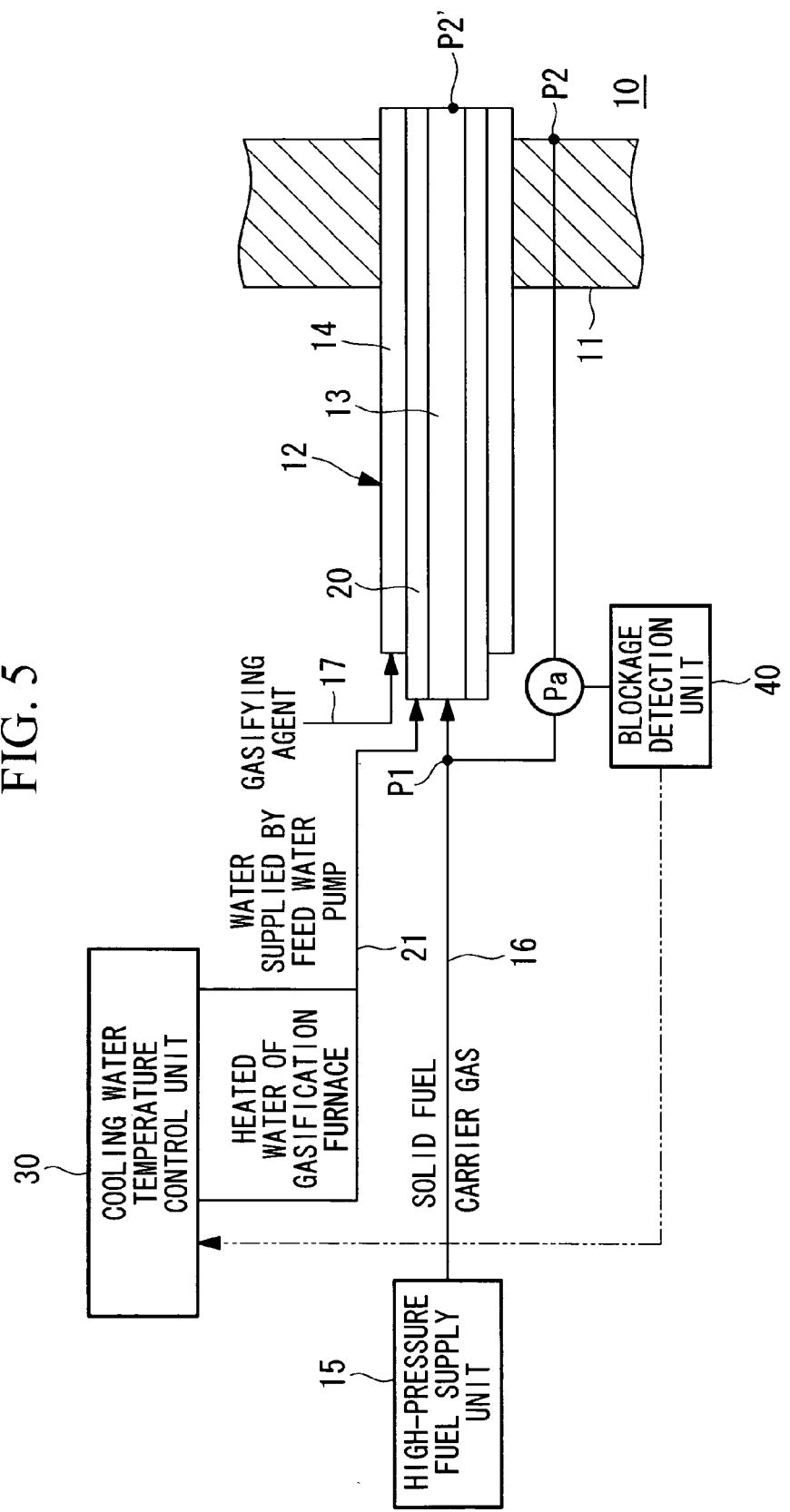
FIG. 5 is a configuration diagram of a relevant part illustrating a third embodiment of a burner for highly caking coal and a gasifier according to the present invention.

According to the embodiment shown in FIG. 5, a cooling water temperature control unit 30 is provided as the cooling water temperature control portion. The cooling water temperature control unit 30 controls the temperature of cooling water by adjusting the mixing ratio of high-temperature heated water of the gasifier and low-temperature water supplied by the water supply pump, based on a blockage situation detection signal that is output from a blockage detection unit 40. That is, the temperature of cooling water is increased by increasing the mixing ratio of heated water of the gasifier, and the temperature of the cooling water is decreased by increasing the mixing ratio of water supplied by the water supply pump.

The blockage detection unit 40 detects a differential pressure Pa between the pressure at the burner inlet of the solid fuel channel 13 and the internal pressure of the gasifier 10 as a suitable place located downstream from the burner inlet. When a flow loss coefficient $\lambda$ converted from that differential pressure Pa increases to at least a predetermined value, the blockage detection unit 40 judges that a blockage situation of the solid fuel channel 13 has been detected, and outputs a blockage situation detection signal.

In the illustrated example, the burner inlet pressure P1 of the solid fuel channel 13 and the internal pressure P2 of the gasifier 10 are detected, and the differential pressure Pa is calculated from the two pressures P1 and P2. It should be noted that for the differential pressure Pa calculated here, a burner outlet pressure P2' may be used in place of the internal pressure P2 of the gasifier 10.

When the blockage detection unit 40 outputs a blockage situation detection signal, the cooling water temperature control unit 30 that receives this control signal carries out a control for decreasing the temperature of cooling water. If the temperature of the cooling water is decreased by this control, then its capability of cooling the solid fuel transported by the gas flow in the solid fuel channel 13 against a high-temperature gasifying agent can be increased. In other words, in order to prevent an excessive temperature decrease of the cooling water and the resulting reduction of the operating efficiency of the gasifier 10, the temperature of the cooling water can be set to a temperature near such an upper limit that the solid fuel channel 13 will not be brought into a blockage situation.

The flow loss coefficient $\lambda$ converted from the differential pressure Pa will be described as following.

In a solid-gas two-phase flow that transports the particles of a solid fuel by gas flow, the differential pressure Pa changes depending on the internal pressure of the gasifier 10, the flow rate of the solid fuel, and the flow rate of a carrier gas. Accordingly, in order to reliably judge the channel blockage situation of the solid fuel channel, it is desirable to carry out a judgment based on a flow loss coefficient $\lambda$ obtained by converting the differential pressure Pa. The flow loss coefficient $\lambda$ is a value used for a known expression for determining the pressure loss of a solid-gas two-phase flow. That is, since the differential pressure Pa described above is a value equivalent to a pressure loss, it is possible to calculate an actual flow loss coefficient $\lambda$ in the burner 12 from the known expression for determining this pressure loss and a detected value of the differential pressure Pa.

It is judged whether or not the flow loss coefficient λ described above has at least a predetermined value.

When the flow loss coefficient λ has at least a predetermined value, it can be judged that a larger pressure loss of at least a predetermined value has occurred in a solid-gas two-phase flow of the solid fuel and the carrier gas that flow through the solid fuel channel 13. That is, it can be judged that a situation has occurred where the pressure loss of the solid-gas two-phase flow increases, including for example, a situation where the solid fuel adheres to the internal surface of the solid fuel channel 13, thus reducing the channel cross sectional area.

Therefore, if the flow loss coefficient λ has increased to at least a predetermined value, or has changed to at least the predetermined value, the blockage detection unit 40 outputs a blockage situation detection signal, and the cooling water temperature control unit 30 that receives this control signal carries out a control for decreasing the temperature of the cooling water.

Such cooling water temperature control unit 30 and blockage detection unit 40 are not only applicable to the burner 12 described above, but also applicable to the other burners 12A, 12B and 12C shown in FIG. 2 to FIG. 4.

Figure 6:
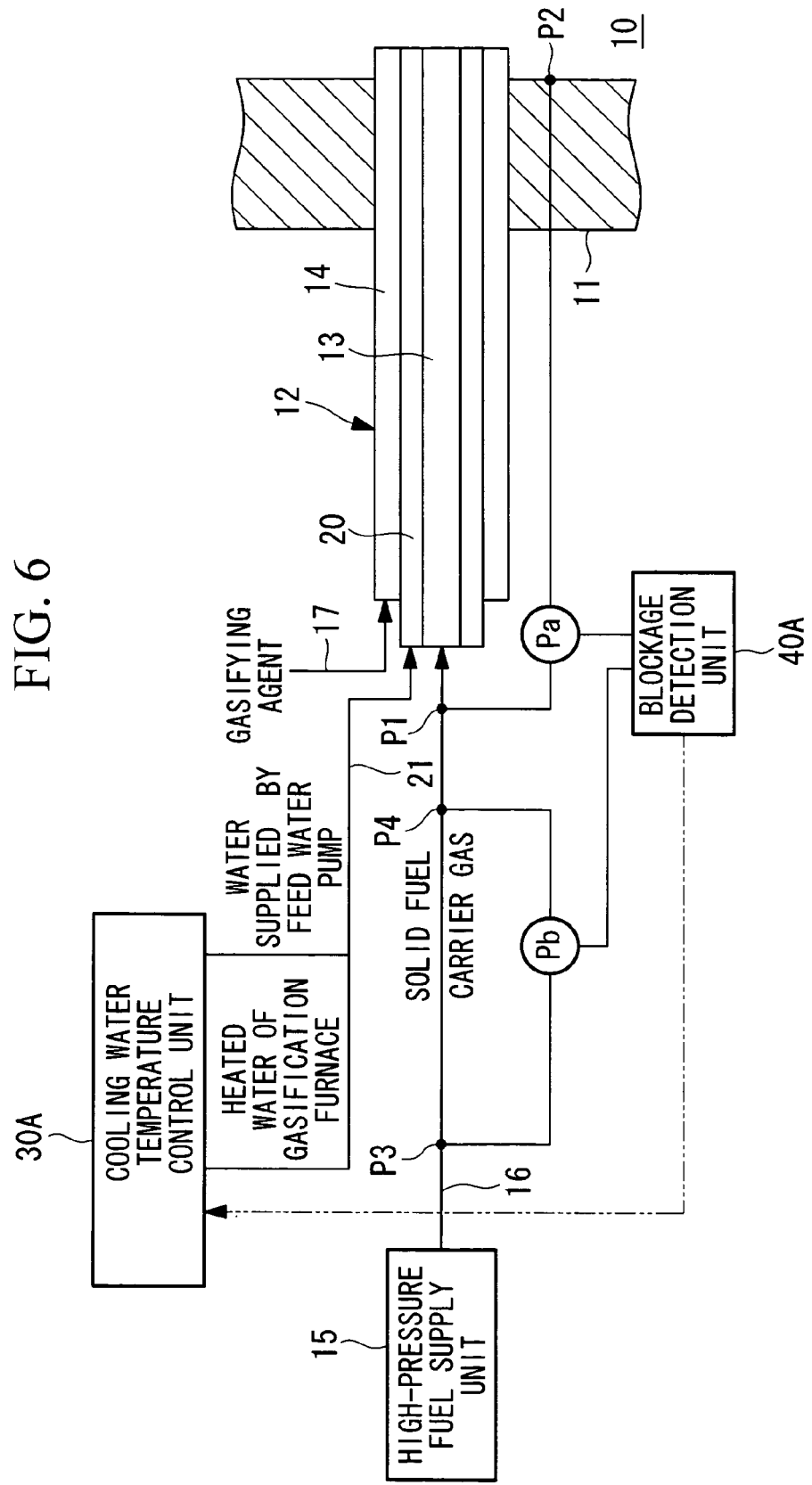
FIG. 6 is a configuration diagram of a relevant part illustrating a first modification of the burner for highly caking coal and the gasifier that are shown in FIG. 5.

Next, for the cooling water temperature control unit 30 using the blockage detection unit 40 described above, a cooling water temperature control unit 30A as its first modification will be described based on FIG. 6. It should be noted that the same portions in FIG. 6 as in the above-described embodiments are denoted by the same reference numerals, and a detailed description thereof has been omitted.

In this first modification, a blockage detection unit 40A that detects a blockage situation that is output to the cooling water temperature control unit 30A uses, as the criterion for judging a channel blockage situation, a flow loss coefficient λ' converted based on the differential pressure ratio, in place of the flow loss coefficient λ converted from the differential pressure Pa according to the embodiment described above.

More specifically, the blockage detection unit 40A judges that a blockage situation has been detected when a flow loss coefficient λ' converted from the differential pressure ratio of a first differential pressure Pa detected between the pressure P1 at the burner inlet and the internal pressure P2 of the gasifier 10 located downstream from the burner inlet, and a second differential pressure Pb measured in an arbitrary section set in the fuel supply line 16 connected to the upstream side of the solid fuel channel 13 has increased to at least a predetermined value. In the illustrated example, two pressures P3 and P4 are detected in two fixed measurement positions set in suitable places of the fuel supply line 16, and a differential pressure Pb generated between the two pressures P3 and P4 is the second differential pressure. That is, the second differential pressure Pb approximately matches the pressure loss that has occurred in a solid-gas two-phase flow that has flown a predetermined channel length set in the fuel supply line 16.

Accordingly, the differential pressure ratio of the first differential pressure Pa and the second differential pressure Pb is a value that will not be affected by the influence of the pressure of the gasifier 10, the flow rate of the solid fuel and the flow rate of the carrier gas, so that it is possible to reliably judge the channel blockage situation of the solid fuel channel 13, based on the flow loss coefficient λ' obtained by this differential pressure ratio. That is, by using, as the judgment criterion, whether or not the flow loss coefficient λ' has at least a predetermined value, and judging the occurrence of a predetermined blockage situation when the flow loss coefficient λ' has at least a predetermined value, the channel blockage situation of the solid fuel channel 13 can be judged even more reliably.

Such cooling water temperature control unit 30A and blockage detection unit 40A are not only applicable to the burner 12 described above, but also applicable to the other burners 12A, 12B and 12C shown in FIG. 2 to FIG. 4.

Figure 7:
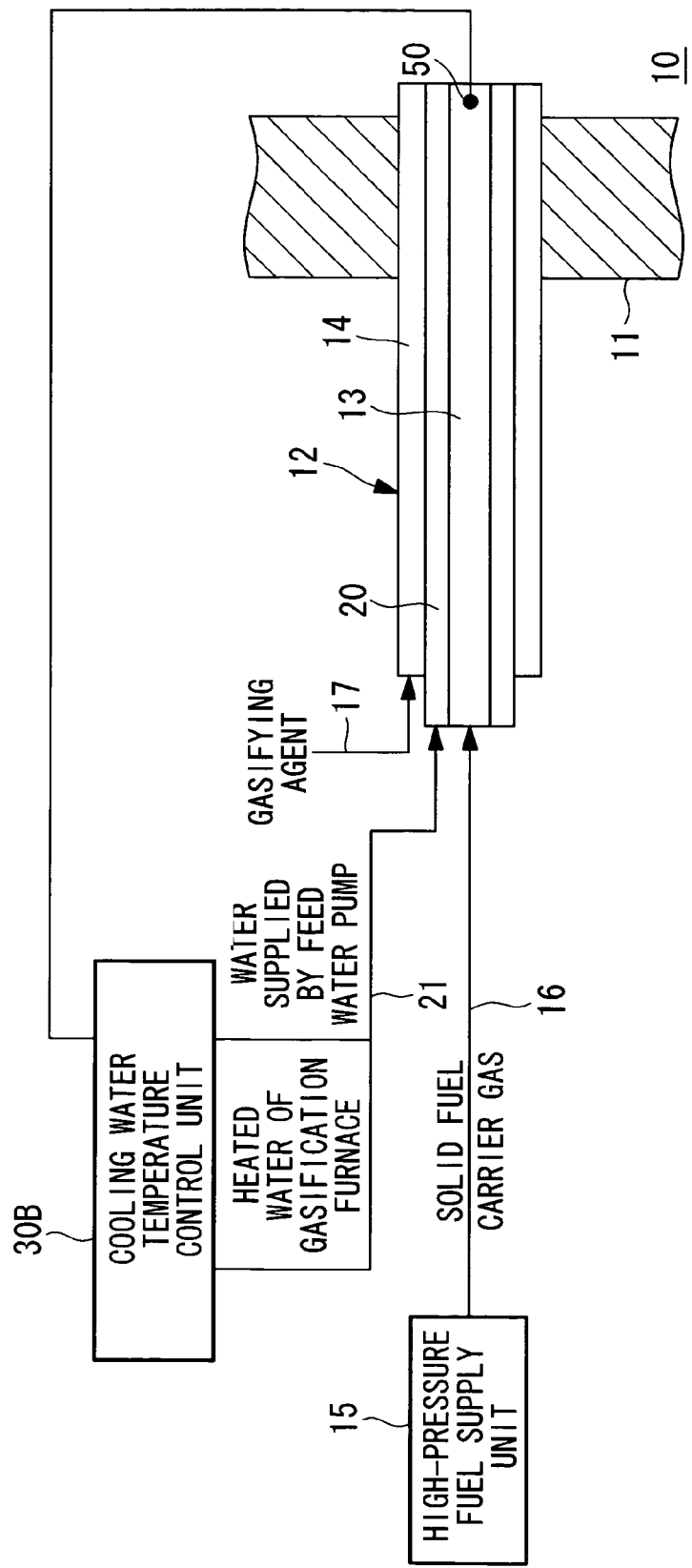
FIG. 7 is a configuration diagram of a relevant part illustrating a second modification of the burner for highly caking coal and the gasifier that are shown in FIG. 5.

Next, a second modification of the cooling water temperature control unit 30 described above will be described based on FIG. 7. It should be noted that the same portions in FIG. 7 as in the above-described embodiments are denoted by the same reference numerals, and a detailed description thereof has been omitted.

In this second modification, a cooling water temperature control unit 30B is provided as the cooling water temperature control portion. The cooling water temperature control unit 30B is provided with a temperature sensor 50 for detecting a temperature of the internal surface of the solid fuel channel 13, and controls the cooling water temperature such that it is decreased, when the internal surface temperature detected with the temperature sensor 50 is a high temperature of at least a predetermined value.

That is, when the temperature sensor 50 detects a high temperature of at least a predetermined value, it outputs a blockage situation detection signal, since it can be judged that the internal surface temperature of the solid fuel channel 13 is high and can cause expansion and fusion of the particles of the solid fuel. Strictly speaking, the blockage situation detection signal in this case is a blockage situation alarm signal (although it also depends on the preset temperature), and is used for detecting the possibility of occurrence of a blockage situation, and preventing this by reducing the cooling water temperature by increasing the mixing ratio of the water supplied by the feed water pump.

Thus, since the internal surface temperature of the solid fuel channel 13 is detected with the temperature sensor 50 and controlled, it is possible to reliably judge the channel blockage situation (possibility of a blockage) of the solid fuel channel 13 based on the actual internal surface temperature detected with the temperature sensor 50.

Such a cooling water temperature control unit 30B is also applicable to the other burners 12A, 12B and 12C shown in FIG. 2 to FIG. 4, as well as to the burner 12 described above.

Figure 8:
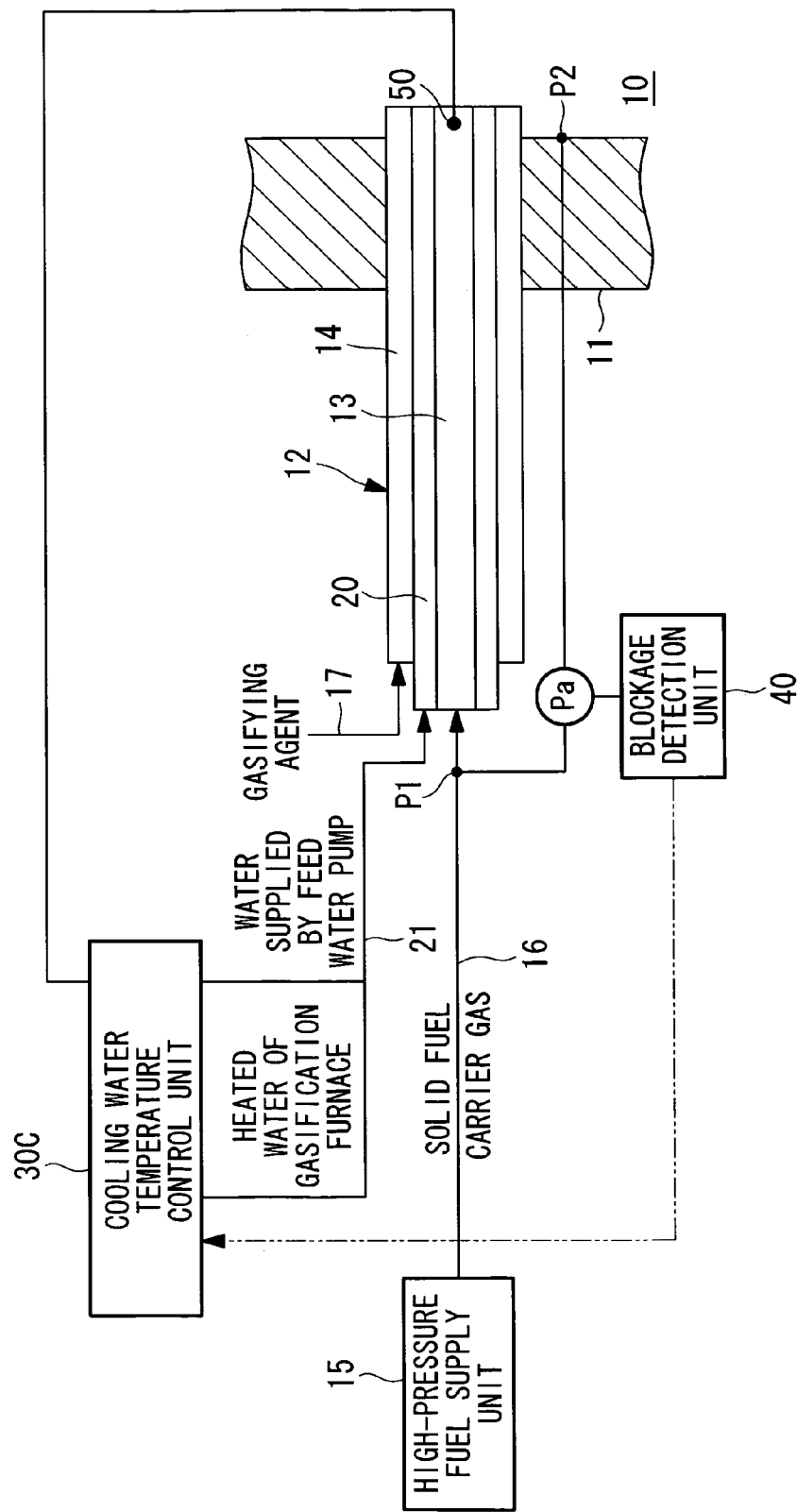
FIG. 8 is a configuration diagram of a relevant part illustrating a third modification of the burner for highly caking coal and the gasifier that are shown in FIG. 5.

The detection temperature of such a temperature sensor 50 may also be used in combination with the blockage situation detection signal that is output by the above-described blockage detection units 40 and 40A, as in a third modification shown in FIG. 8. That is, as in a cooling water temperature control unit 30C as shown in FIG. 8, a blockage situation of the solid fuel channel 13 is directly detected by the blockage detection unit 40, and the internal surface temperature of the solid fuel channel 13 is detected by the temperature sensor 50. Then, the cooling water temperature is adjusted so that this internal surface temperature will be smaller than a preset temperature determined according to the caking property of the solid fuel.

Therefore, when the blockage detection unit 40 detects a blockage situation of the solid fuel channel 13 and decreases the temperature of the cooling water, using the detection temperature of temperature sensor 50 makes it possible to perform a control so that the operation efficiency of the gasifier 10 will not be reduced due to an excessive temperature decrease of the cooling water. That is, it is possible to minimize the reduction in the operating efficiency of the gasifier 10, and prevent agglomeration of the solid fuel particles and blockage of the solid fuel feed pipe channel 13.

Such cooling water temperature control unit 30C and blockage detection unit 40 are also applicable to the other burners 12A, 12B and 12C shown in FIG. 2 to FIG. 4, as well as to the burner 12 described above. Further, the blockage detection unit 40 that outputs a blockage detection signal to the cooling water temperature control unit 30C may also be combined with a blockage detection unit 40' that uses a method in which the flow loss coefficient λ' is converted from a differential pressure ratio.

Thus, with the burner 12 for highly caking coal and the gasifier 10 of the present invention, the burner 12 for highly caking coal that is used for the gasifier 10 for gasifying a highly caking solid fuel has a concentric triple pipe structure including the cooling water channel 20, 20A, 20B or 20C that circulates or passes cooling water between the solid fuel channel 13 and the gasifying agent channel 14. Accordingly, the difference in temperature between the solid fuel channel 13 and the gasifying agent channel 14 is reduced by the cooling water flowing through the cooling water channel 20, 20A, 20B or 20C provided between the solid fuel channel 13 and the gasifying agent channel 14. Consequently, the heating amount that the solid fuel particles receive from a high-temperature gasifying agent decreases, so that it is possible to prevent or suppress the fusion and the expansion due to an increase in temperature of the particles of a highly caking solid fuel.

Accordingly, it is possible to prevent the problem that fused and expanded adjacent particles agglomerate due to the temperature increase of the highly caking solid fuel, thereby causing incomplete combustion, or the problem that those particles adhere to the internal surface of the solid fuel channel 13, thereby causing blockage. Accordingly, it is possible to operate the burner for highly caking coal and the gasifier in a stable manner. Furthermore, it is also possible to expand the range of applications for highly caking solid fuels that can be used for the burner for highly caking coal and the gasifier.

Moreover, by recovering used cooling water having an elevated temperature and using the cooling water by converting it, for example, into power generating water steam, it is possible to eliminate energy loss, and by charging the cooling water into a gasifier as a gasifying agent, the cooling water is converted into a gasifying gas through a gasification reaction, and thus can be effectively used for the operation of the gasifier 10.

It should be appreciated that the present invention is not limited to the embodiments described above, and can be suitably changed without departing from the gist of the present invention.

The invention claimed is:

1. A burner for highly caking coal in which a solid fuel channel that is attached penetrating through a furnace wall of a gasifier for gasifying a highly caking solid fuel that has been pulverized into particles and that supplies the solid fuel into the gasifier by gas flow transportation, and a gasifying agent channel that supplies a gasifying agent into the gasifier are provided in a double pipe structure, wherein the burner has a triple pipe structure comprising a cooling water channel that circulates cooling water between the solid fuel channel and the gasifying agent channel, and the cooling water is recovered after use, and the burner further comprises a cooling water temperature control portion that detects a blockage situation of the solid fuel channel, and adjusts a temperature of the cooling water.

2. The burner for highly caking coal according to claim 1, wherein the cooling water temperature control portion detects a differential pressure between a burner inlet of the solid fuel channel and a suitable place located downstream from the burner inlet, and decreases the temperature of the cooling water when a flow loss coefficient converted from the differential pressure increases to at least a predetermined value.

3. The burner for highly caking coal according to claim 1, wherein the cooling water temperature control portion decreases the temperature of the cooling water when a flow loss coefficient converted from a differential pressure ratio of a first differential pressure detected between a burner inlet and a suitable place located downstream from the burner inlet and a second differential pressure measured in an arbitrary section set in a fuel supply line connected to an upstream side of the solid fuel channel increases to at least a predetermined value.

4. The burner for highly caking coal according to claim 1, wherein the cooling water temperature control portion detects an internal surface temperature of the solid fuel channel, and decreases the temperature of the cooling water when the detected internal surface temperature is a high temperature of at least a predetermined value.

5. The burner for highly caking coal according to claim 1, wherein the cooling water temperature control portion detects an internal surface temperature of the solid fuel channel, and adjusts the temperature of the cooling water so that the internal surface temperature will be smaller than a preset temperature determined according to a caking property of the solid fuel.

6. A gasifier into which a solid fuel including particulate highly caking coal is supplied by gas flow transportation, and that subjects the solid fuel to a gasification treatment under a high-pressure environment together with a gasifying agent, the gasifier comprising:

the burner for highly caking coal according to claim 1.

* * * * *